United States Patent
Rahnhöfer

(10) Patent No.: US 7,537,442 B2
(45) Date of Patent: May 26, 2009

(54) INDEX DRIVE, AND FLUID PASSAGE FOR AN INJECTION MOLDING MACHINE

(75) Inventor: Klaus Rahnhöfer, Büchenbach (DE)

(73) Assignee: Demag Ergotech GmbH, Schwaig (DE)

( * ) Notice: Subject to any disclaimer, the term of this patent is extended or adjusted under 35 U.S.C. 154(b) by 406 days.

(21) Appl. No.: 11/342,205

(22) Filed: Jan. 27, 2006

(65) Prior Publication Data
US 2006/0172036 A1 Aug. 3, 2006

(30) Foreign Application Priority Data
Feb. 3, 2005 (DE) ................ 10 2005 005 202

(51) Int. Cl.
*B29C 45/16* (2006.01)

(52) U.S. Cl. .............. 425/190; 425/134; 425/257; 425/261; 425/576

(58) Field of Classification Search ........... 425/556, 425/190, 574, 575, 576, 185, 436 R, 134, 425/257, 192 R, 261, 130; 264/328.8, 328.11, 264/255
See application file for complete search history.

(56) References Cited

U.S. PATENT DOCUMENTS

| | | | | |
|---|---|---|---|---|
| 4,370,124 A | * | 1/1983 | Buja .................... | 425/556 |
| 6,402,504 B1 | * | 6/2002 | Hahn et al. .......... | 425/574 |
| 6,790,027 B1 | * | 9/2004 | Callen et al. ........ | 425/556 |
| 6,849,219 B2 | * | 2/2005 | Rollins ................ | 264/255 |
| 6,923,633 B2 | * | 8/2005 | Rudolph et al. ..... | 425/130 |
| 7,108,498 B2 | * | 9/2006 | Lai ...................... | 425/190 |
| 2002/0081350 A1 | * | 6/2002 | Elder et al. .......... | 425/576 |
| 2004/0195722 A1 | * | 10/2004 | Yang .................... | 264/255 |
| 2005/0082714 A1 | * | 4/2005 | Rollins ................ | 264/255 |

FOREIGN PATENT DOCUMENTS

| | | |
|---|---|---|
| DE | 101 45 461 A1 | 8/2002 |
| DE | 10145730 C1 * | 2/2003 |
| DE | 10145729 C1 * | 4/2003 |
| FR | 2725152 * | 9/1994 |
| WO | WO2006018364 A1 * | 2/2006 |

OTHER PUBLICATIONS

Integ.Drehvorrichtung,Kunststoffe 86,Carl Hanser Ver.1996.
Keusgen H: "Die heiss-kalte Lösung 2-K-Werkzeug für Teile aus Thermoplast und LSR", Kunststoffe, Carl Hanser Verlag, Munich, DE, vol. 91, No. 3, Mar. 2001, pp. 92-94, XP001039127, ISSN: 0023-5563 figure 2.
Keusgen H: "Pneumatische Zwangsentformung", Kunststoffe, Carl Hanser Verlag, Munich, DE, vol. 90, No. 4, Apr. 2000, pp. 72-74, XP002358479, ISSN: 0023-5563, figure 1.

* cited by examiner

*Primary Examiner*—Yogendra Gupta
*Assistant Examiner*—Sean S Luk
(74) *Attorney, Agent, or Firm*—Henry M. Feiereisen; Ursula B. Day

(57) ABSTRACT

A machine-side ejector assembly for an injection molding machine having a mold mounting plate includes an ejector plate which is movable relative to the mold mounting plate, and a rotatable shaft having one end received by the ejector plate. An indexing plate is connectable to the rotatable shaft, with a rotary drive, disposed on or in the ejector plate, for rotating the indexing plate via the rotatable shaft.

28 Claims, 3 Drawing Sheets

INDEX DRIVE, AND FLUID PASSAGE FOR AN INJECTION MOLDING MACHINE

CROSS-REFERENCES TO RELATED APPLICATIONS

This application claims the priority of German Patent Application, Serial No. 10 2005 005 202.9-16, filed Feb. 3, 2005, pursuant to 35 U.S.C. 119(a)-(d), the content of which is incorporated herein by reference.

BACKGROUND OF THE INVENTION

The present invention relates, in general, to an ejector assembly for an injection molding machine, and to an injection molding machine equipped with such an ejector assembly.

Nothing in the following discussion of the state of the art is to be construed as an admission of prior art.

An injection molding machine of a type involved here includes a mold mounting plate and an ejector plate which is movable relative to the mold mounting plate. Multi-component or multi-colored injection-molded articles can be produced in many ways. One process involves the so-called indexing plate method which involves a modification of the injection mold such that an additional indexing plate is placed between two basic mold halves of the injection molding machine. The indexing plate is rotatable about a center axis and can be moved axially in length direction of the machine. The indexing plate forms a central part of the cavity for making a preform which can be unchanged. After detachment from the fixed mold part, the indexing plate turns about a fixed angle, for example 120° or 180°, for placing the preform in a further cavity for molding on a further component. As the indexing plate undergoes an axial stroke before being turned, contrary to mold halves arranged on turntables, a placement of the preform in a cavity is now possible having a contour which changes on the side facing the moving mold mounting plate so as to permit the formation of back injections for example. After turning operation, the indexing plate is again moved back axially to the respective cavities.

German Offenlegungsschrift DE 101 45 461 A1 describes various examples of injection molding machines with an indexing plate. One example involves the attachment of a rotary unit on the moving mold mounting plate. The rotary unit includes a housing for rotatable support of a gear. The gear is hollow on the inside and configured with several grooves. The rotatable shaft of the indexing plate is formed with a complementary multi-grooved profile and extends through the gear. The rotatable shaft has a mold-side end, which is connected to the indexing plate, and an opposite end, which is connected to a linear drive, e.g. a hydraulic cylinder, so that the indexing plate can move in and out in relation to the fixed mold component. Disposed in the housing of the rotary unit at a right angle to the length axis of the machine is a toothed rod which is in engagement with the gear and is moved forward and backward by hydraulic cylinders. In this way, the gear can be rotated by an angle in correspondence to the stroke of the toothed rod, i.e. always alternating between clockwise and counterclockwise.

Another example described in German Offenlegungsschrift DE 101 45 461 A1 involves the use of a hydraulic motor or electric motor for rotating the indexing plate. The motor is hereby received in a recess of the moving mold mounting plate and includes a hollow shaft with a multi-grooved profile in correspondence to the multi-grooved profile of the rotatable shaft of the indexing plate.

In order to accommodate a flow of fluids on the indexing plate of an injection molding machine, the rotatable shaft is formed with passageways, normally axial bores, which extend parallel to an axis of symmetry of the rotatable shaft substantially along the entire length thereof. These channels can then be used in the area of the indexing plate for passage of heating means, compressed air, electric supply lines, or the like. Supply of fluids is normally realized using so-called rotary feedthroughs which supply fluid regardless of the angular position of the rotatable shaft relative thereto. The rotary feedthrough is normally connected to the rotatable shaft in axially fixed but rotatable relationship. When undergoing an axial stroke before the indexing plate is turned, the rotary feedthrough moves axially jointly with the rotatable shaft and the indexing plate. Also, a replacement of indexing plates is labor-intensive because the rotatable shaft of a replaced indexing plate must be provided again with a rotary feedthrough, securely anchored thereto.

It would therefore be desirable and advantageous to provide an improved machine-side ejector assembly which obviates prior art shortcomings and which is simple and compact in structure to allow standard injection molding machines to be retrofitted therewith and their use with indexing plate feature, and easy exchange of various injection molding machines, while still being easy to maintain and reliable in operation.

It would also be desirable and advantageous to provide an improved injection molding machine which uses standard mold mounting plates while being applicable in a simple manner for operation with indexing plate (multi-component or multi-colored injection molding) and operation without indexing plate.

SUMMARY OF THE INVENTION

According to one aspect of the present invention, a machine-side ejector assembly for an injection molding machine having a mold mounting plate, a rotatable shaft, and an indexing plate intended for connection to the rotatable shaft, includes an ejector plate movable relative to the mold mounting plate, and a rotary drive, disposed on or in the ejector plate, for rotating the indexing plate via the rotatable shaft.

To ensure clarity, it is necessary to establish the definition of important terms and expressions that will be used throughout this disclosure. The term "machine-side ejector plate" relates to the placement of an ejector plate on the machine side of an injection molding machine. The present invention thus resolves prior art problems by providing the ejector plate on the machine side of an injection molding machine, rather than placing an ejector mechanism on the side of the injection mold, i.e. on the mold-facing side of a mold mounting plate or inside a mold half. The ejector plate can move axially relative to the moving mold mounting plate which supports a mold half for accommodating an indexing plate which is constructed to rotate and to move axially in relation to the mold half. A displacement of the ejector plate along the length axis of the injection molding machine can thus be transmitted via the rotatable shaft at least indirectly onto the indexing plate. The indexing plate is hereby connected to the rotatable shaft or connectable thereto in fixed rotative engagement. Suitably, the rotary drive is provided for rotating the indexing plate via the rotatable shaft and can be disposed on or in the machine-side ejector plate. As a result, installation space can be saved as an ejector plate is normally provided on injection molding machine, which means that the required space is already accounted for. Thus, the need for a space-reducing intermediate plate for provision of a rotary drive for an indexing plate can be eliminated.

The provision of the rotary drive on the machine-side ejector plate eliminates also the need for complex modifications of a mold half or a mold mounting plate in order to provide space for the rotary drive for the indexing plate. Thus, standard components can basically be used so long as a throughbore for passage of the rotatable shaft of the indexing plate is present and the indexing plate can be supported by the respective components for optional rotation and axial displacement. Thus, a conventional injection molding machine can be converted to an injection molding machine having a mold with indexing plate by simply replacing the existing ejector plate with an ejector plate according to the invention.

According to another feature of the present invention, the rotary drive may be constructed as hydraulic motor, servo motor or direct drive. The torque may be transmitted from the output shaft of the motor to the rotatable shaft via a belt drive or gears for example. In the event of a direct drive, the rotatable shaft may for example engage a hollow shaft via grooves or flange mounted in fixed rotative engagement to an output shaft.

According to another feature of the present invention, the rotary drive may be disposed on a side surface of the ejector plate. Currently preferred is the attachment of the rotary drive on the side which is distal to the moving mold mounting plate. In this way, the relative movement between the ejector plate and the mold mounting plate remains substantially unrestricted. The rotary drive may also be disposed in a peripheral area or on a narrow side of the ejector plate, substantially offset to the length axis of the injection molding machine for example. As a result, sufficient space is maintained on the side of the ejector plate distal to the mold mounting plate for mechanisms of clamping units of the injection molding machine, such as toggle lever. This is beneficial in particular when retrofitting such an ejector plate because necessary manipulations are kept to a minimum.

According to another feature of the present invention, the rotatable shaft which is connected or connectable to the indexing plate, may be supported in axially fixed but rotatable engagement in or on the ejector plate. Such a support enables a transmission of the axial stroke between the ejector plate and the mold mounting plate onto the indexing plate. This axial stroke can be generated by any suitable means known in the art; for example, by hydraulic cylinders acting between the ejector plate and mold mounting plate. Suitably, the support is disposed substantially inside the ejector plate but may also be flange-mounted thereto. Ball bearings may be employed in this case for example.

According to another feature of the present invention, a force transmitting mechanism may be provided for transmitting a torque from the rotary drive to the rotatable shaft connected or connectable to the indexing plate. For example, intermeshing gears or a belt drive may be provided and disposed substantially within the ejector plate. As a result, installation space can be saved, less noise develops, and the risk of injury by moving parts is reduced.

According to another feature of the present invention, the ejector plate may be made of several parts to allow accommodation of the rotary drive, force transmitting mechanism, or support of the rotatable shaft, in recesses of the parts of the ejector plate, when the parts are joined together. Joining of two or more parts, especially when constructed as partial plates, results in a simple production of an ejector plate according to the invention with formed recesses for different elements. The recesses may be made for example through a simple milling operation or sawing operation of respective partial plates and/or intermediate plates.

According to another feature of the present invention, a rotary feedthrough may be provided and connected to the ejector plate for passage of fluids through the rotatable shaft to the indexing plate. The rotary feedthrough may be flange-mounted to the ejector plate. In this way, a rotation between the ejector plate and the rotary feedthrough can be prevented. Attachment of the rotary feedthrough to the ejector plate also provides protection of the rotary feedthrough and allows easy supply and drainage of fluids. Suitably, the rotary feedthrough is not only axially fixed to the rotatable shaft but is also stabilized as a result of the connection with the ejector plate. Overall, a stable connection is realized between the ejector plate, rotary feedthrough and rotatable shaft, while still maintaining full rotatability of the rotatable shaft in relation to the ejector plate and rotary feedthrough.

The provision of such a fixed connection between the ejector plate and the rotary feedthrough is also advantageous when conventional rotary drives for the rotatable shaft are involved. Thus, it is also conceivable to provide the ejector plate with a single support of the rotatable shaft and with a single rotary feedthrough connected thereto, while employing a conventional rotary drive for the rotation movement of the rotatable shaft, without departing from the spirit of the present invention.

According to another feature of the present invention, a fluid passageway may be provided at least partially through the ejector plate for fluid communication with the rotary feedthrough and thereby allow supply of respective fluids to the rotary feedthrough. For example, the ejector plate may be formed with feed bores extending to the rotary feedthrough for supply and drainage of fluids. In particular, when the ejector plate is made of several parts, such channels are easy to form. This type of construction is advantageous because the space between the ejector plate and the mold mounting plate is substantially clear of supply lines. The channels may be supplied with fluids via flexible lines which can be attached only in the peripheral area. The provision of such short flexible lines that are hardly moved reduces the risk of leakage and enhances the accessibility of the installation space.

According to another feature of the present invention, the rotatable shaft may be made of several parts, preferably two parts, with the parts being detachably connectable to one another and allowing transmission of a torque from the rotary drive to the indexing plate via the rotatable shaft. Feedthrough channels within the rotatable shaft should be fluidly connected in a tight manner to ensure a continuous flow path between the fluid supply and fluid discharge, on one hand, and respective connection ports on the indexing plate. The connection between the parts of the rotatable shaft may be realized for example via respective flange elements, a respective torque-transmitting connection via an internal bore, or similar mechanical connections.

The construction of the rotatable shaft of several parts also allows easy replacement of the indexing plate with the adjacent part of the rotatable shaft. Thus, it is only necessary to exchange the indexing plate with the adjacent part of the rotatable shaft, while the remainder of the rotatable shaft on the side of the ejector plate may remain fixedly supported. Thus, there it is only required to loosen the connections between the individual parts of the rotatable shaft whereas the rotary drive of the shaft, the possible support of the rotatable shaft upon the ejector plate, and optionally a rotary feedthrough for the fluids and their adjustment to the ejector plate side part of the rotatable shaft as well as their supplies may remain unchanged. This simple exchangeability is unprecedented and could not have been achieved by the conventional typical rigid axial anchoring between a rotary feedthrough and rotatable shaft, regardless of the disposition of the rotary drive for effecting the rotation of the indexing plate.

According to another feature of the present invention, an angle transmitter may be provided for ascertaining an angle or rotation between the ejector plate and the rotatable shaft. Thus, especially when interposing gear trains such as gears, the position of the indexing plate can be determined more accurately compared to an angle measurement on the rotary drive. Suitably, an inductive sensor may be provided and constructed with a respective cam disk which is securely fixed to the rotatable shaft for determining rotational position of the indexing plate.

According to another aspect of the present invention, an injection molding machine includes a mold mounting plate carrying a mold half, a rotatable shaft having one end received in the mold mounting plate, an indexing plate constructed for connection to the rotatable shaft and rotatable and axially movable in relation to the mold half, an ejector plate operatively connected to another end of the rotatable shaft so that an axial movement between the ejector plate and the mold mounting plate is transmittable to the indexing plate via the rotatable shaft, and a rotary drive, disposed on or in the ejector plate, for rotating the indexing plate via the rotatable shaft. Such an injection molding machine with the ejector plate according to the present invention can be operated especially advantageous.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1A:
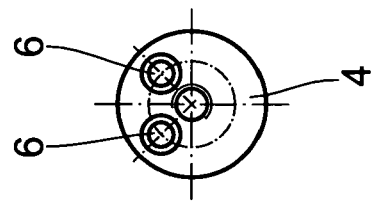
FIG. 1a is a sectional view of a rotatable shaft perpendicular to a length axis of the injection molding machine.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
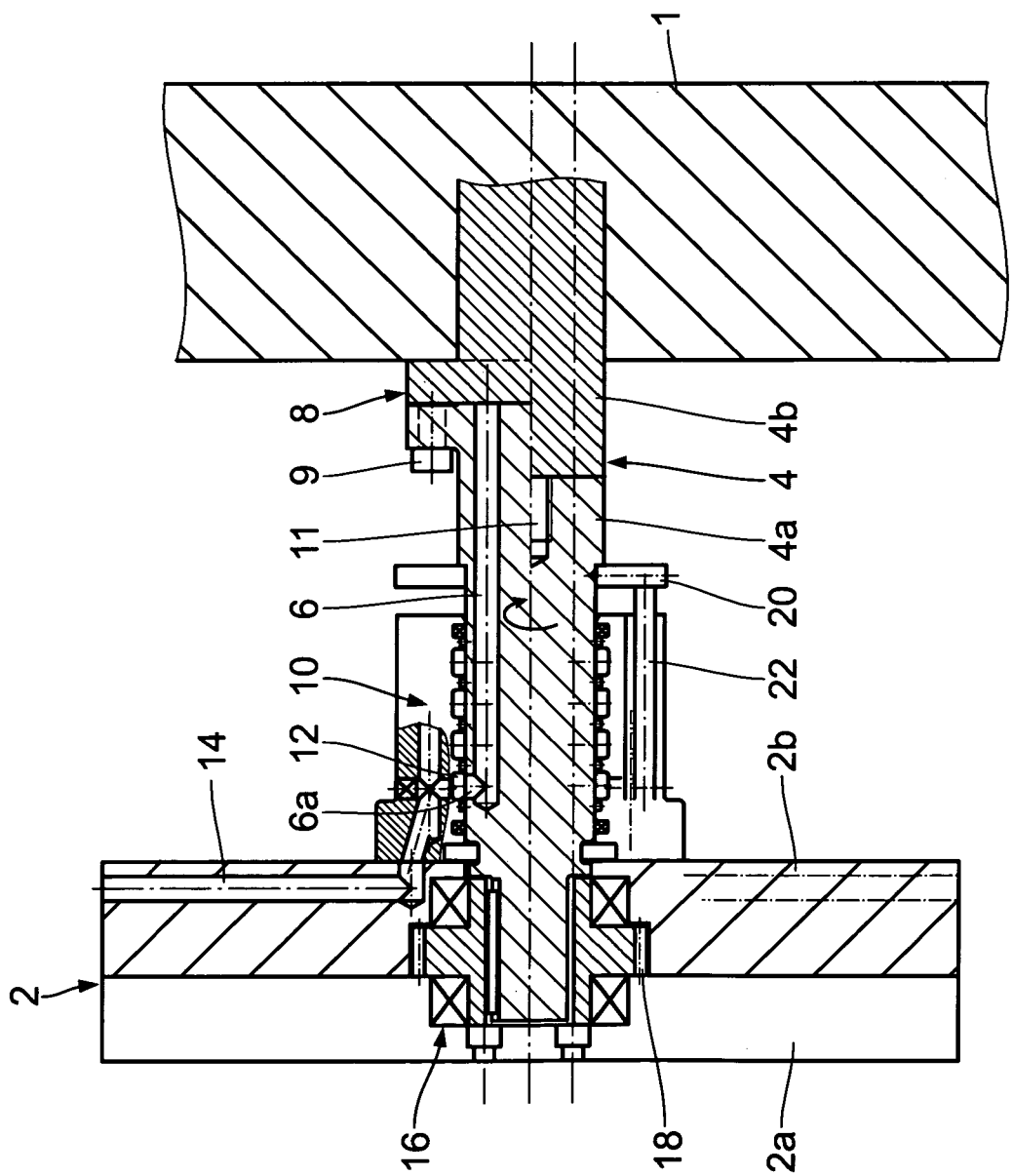
FIG. 1 is a longitudinal section of an ejector assembly according to the present invention for an injection molding machine.
Figure 3:
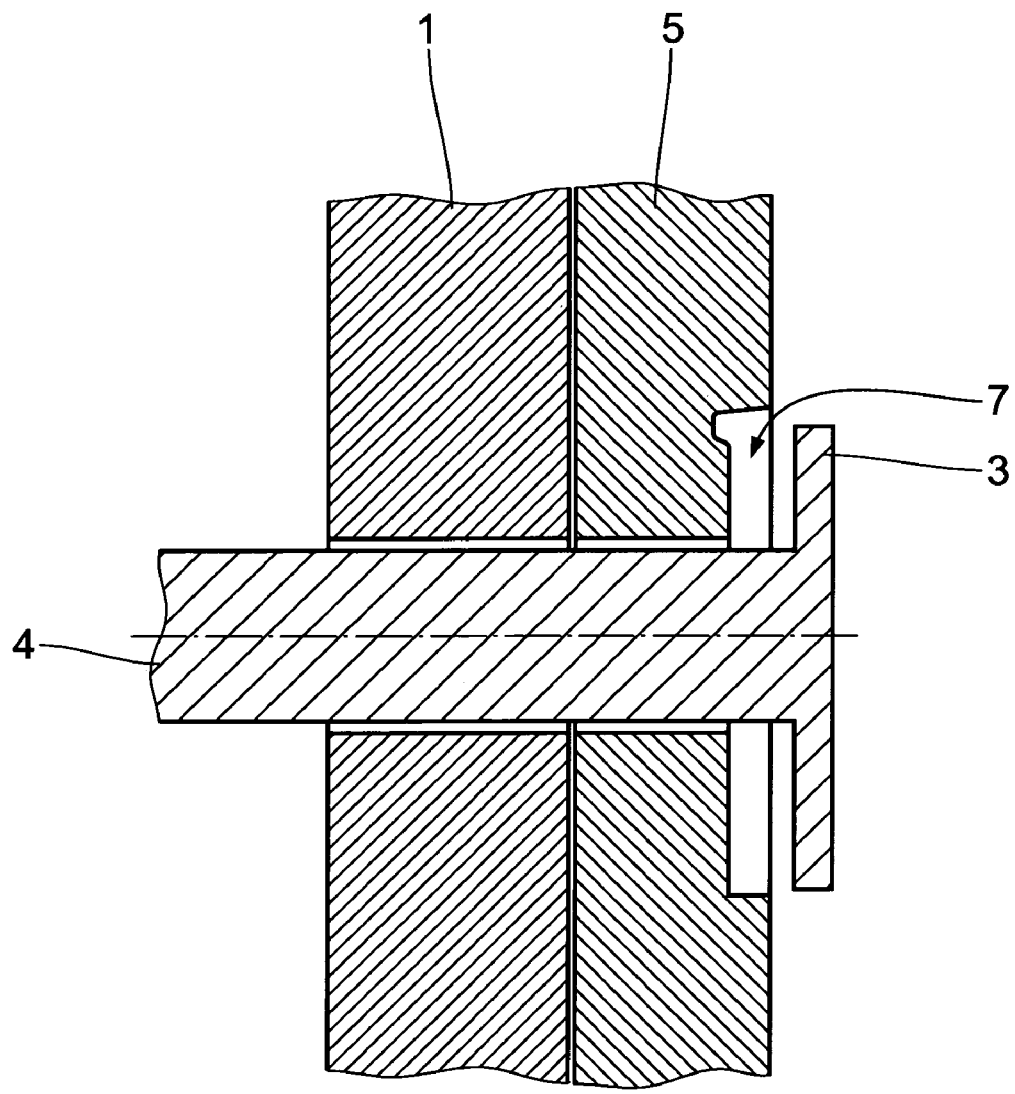
FIG. 3 is a cutaway sectional view of a mold mounting plate with the rotatable shaft and indexing plate.

Turning now to the drawing, and in particular to FIG. 1, there is shown a longitudinal section of an ejector plate according to the present invention, generally designated by reference numeral 2, for installation in an injection molding machine, depicted only partially and including a mold mounting plate 1 which is movable in relation to an unillustrated fixed mold mounting plate and supports a mold half 5 (FIG. 3). The mold mounting plate 1 has a bore for receiving one end of a rotatable shaft, generally designated by reference numeral 4 and connected to an indexing plate 3, as shown in FIG. 3. The indexing plate 3 is received in a pocket 7 of the mold half 5 on the right hand side of the mold mounting plate 1 for rotation and axial mobility in relation to the mold half 5. FIG. 3 shows the indexing plate 3 in a position detached from the mold half 5 to allow rotation thereof. Formed in an upper area of the pocket 7 is a recess 13 to allow formation of an undercut. A cross section of the rotatable shaft 4 is shown in FIG. 1a to illustrate the provision of two fluid channels 6 for supply and discharge of a fluid, such as heating fluid, to the indexing plate. The channels 6 extend through the rotatable shaft 4 in axis-parallel relationship and end in branch bores 6a.

The ejector plate 2 is movable in axial direction relative to the mold mounting plate 1 and constructed with an internal toothed wheel 18 which is connected in fixed rotative engagement to the rotatable shaft 4 via grooves formed on the other adjacent end of the rotatable shaft 4. Bearings 16 are disposed in recesses of the ejector plate 2 for rotatable support of the toothed wheel 18 and the rotatable shaft 4. The ejector plate 2 is made of two plate portions 2a, 2b which are suitably joined together and respectively constructed with the recesses, e.g. through milling.

A rotary feedthrough, generally designated by reference numeral 10, is connected to the ejector plate 2 and includes annular grooves 12 which are fluidly connected with the branch bores 6a, regardless of a rotational position of the rotatable shaft 4. Although not shown in detail, the rotary feedthrough 10 has further grooves which extend axially offset to the annular grooves 12 and are sealed from the annular grooves 12 by seals (not shown) and which are fluidly connected to further unillustrated channels. The rotary feedthrough 10 is supplied with fluids via a feed bore 14 formed in the plate portion 2b of the ejector plate 2. An inductive sensor 22 is mounted to the rotary feedthrough 10 for determining a rotation position of a cam disk 20 securely fixed to the rotatable shaft 4. In this way, the rotation position of the rotatable shaft 4 and thus of the indexing plate 3 can be ascertained.

As shown in FIG. 1, the rotatable shaft 4 is made of two shaft portions 4a, 4b, with the shaft portion 4a connected to the ejector plate 2, and with the shaft portion 4b connected to the mold mounting plate 1 and thus positioned on the side of the indexing plate 3. The shaft portions 4a, 4b are joined together in fixed rotative engagement and in a fluid-tight manner by a mechanical connection, generally designated by reference numeral 8. In the upper part of FIG. 1, the abutting ends of the shaft portions 4a, 4b are hereby formed with flanges that are connected together by screw fasteners 9. In the lower part of FIG. 1, the mechanical connection 8 includes a threaded engagement 11 between the shaft portions 4a, 4b.

Figure 2:
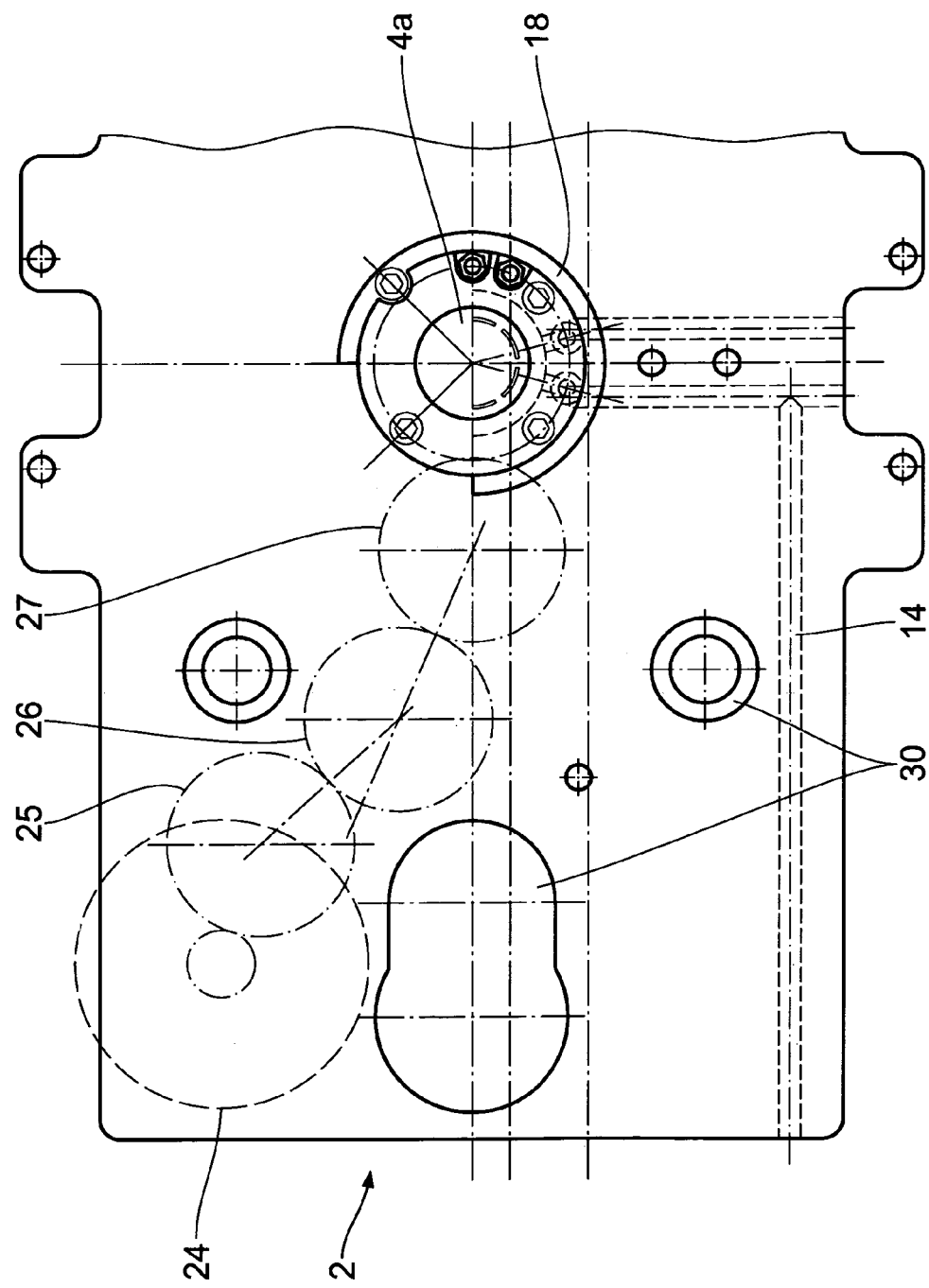
FIG. 2 is a top plan view of the ejector plate.

Referring now to FIG. 2, there is shown a top plan view of the ejector plate 2. As can be seen therefrom, a rotary drive 24 is disposed at a side area of the ejector plate 2 and is in driving relationship with the toothed wheel 18 via gears 25, 26, 27. The ejector plate is further formed with openings 30 for passage of appropriate elements.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the inven-

What is claimed as new and desired to be protected by Letters Patent is set forth in the appended claims and includes equivalents of the elements recited therein:

What is claimed is:

1. A machine-side ejector assembly for an injection molding machine having a mold mounting plate a rotatable shaft, and an indexing plate intended for connection to the rotatable shaft, comprising:
   an ejector plate movable relative to the mold mounting plate; and
   a rotary drive, disposed on or in the ejector plate, for rotating the indexing plate via the rotatable shaft, wherein the rotatable shaft is made of two portions which are detachably connectable to one another and allow transmission of a torque from the rotary drive to the indexing plate.

2. The ejector assembly of claim 1, wherein the rotatable shaft is supportable in axially fixed but rotatable engagement in or on the ejector plate.

3. The ejector assembly of claim 1, further comprising force transmitting means, disposed within the ejector plate, for transmitting a torque from the rotary drive to the rotatable shaft.

4. The ejector assembly of claim 3, wherein the ejector plate is made of several parts to allow accommodation of at least one member selected from the group consisting of rotary drive, force transmitting elements, and bearing of the rotatable shaft, in recesses of the parts of the ejector plate, when the parts are joined together.

5. The ejector assembly of claim 1, further comprising a rotary feedthrough, connected to the ejector plate, for passage of fluids via the rotatable shaft to the indexing plate.

6. The ejector assembly of claim 5, wherein the rotary feedthrough is securely fixed to the ejector plate.

7. The ejector assembly of claim 1, further comprising a fluid passageway constructed at least partially through the ejector plate and fluidly communicating with the rotary feedthrough.

8. The ejector assembly of claim 5, further comprising passageway means for flow of fluid from the rotary feedthrough via the rotatable shaft to the indexing plate.

9. The ejector assembly of claim 1, wherein the rotary drive is constructed as hydraulic motor, servo motor or direct drive.

10. The ejector assembly of claim 1, wherein the rotary drive is disposed on a side of the ejector plate.

11. The ejector assembly of claim 10, wherein the mold mounting plate is constructed for movement, said side of the ejector plate being distal to the mold mounting plate.

12. The ejector assembly of claim 1, wherein the rotary drive is disposed at a peripheral area or a narrow side of the ejector plate, substantially offset to a length axis of the injection molding machine.

13. The ejector assembly of claim 3, wherein the force transmitting means includes a toothed wheel rotatably supported by the ejector plate and constructed for meshing engagement with the rotatable shaft.

14. A machine-side ejector assembly for an injection molding machine having a mold mounting plate, a rotatable shaft, and an indexing plate intended for connection to the rotatable shaft, comprising:
   an ejector plate movable relative to the mold mounting plate;
   a rotary drive, disposed on or in the ejector plate, for rotating the indexing plate via the rotatable shaft, and
   an angle transmitter for ascertaining an angle or rotation between the ejector plate and the rotatable shaft.

15. The ejector assembly of claim 14, wherein the angle transmitter includes an inductive sensor operatively connected to a cam disk which is securely fixed to the rotatable shaft for determining a rotational position of the indexing plate.

16. The ejector assembly of claim 14 wherein the rotatable shaft is supportable in axially fixed but rotatable engagement in or on the ejector plate.

17. The ejector assembly of claim 14, further comprising force transmitting means, disposed within the ejector plate, for transmitting a torque from the rotary drive to the rotatable shaft.

18. The ejector assembly of claim 17, wherein the ejector plate is made of several parts to allow accommodation of at least one member selected from the group consisting of rotary drive, force transmitting elements, and bearing of the rotatable shaft, in recesses of the parts of the ejector plate, when the parts are joined together.

19. The ejector assembly of claim 14, further comprising a rotary feedthrough, connected to the ejector plate, for passage of fluids via the rotatable shaft to the indexing plate.

20. The ejector assembly of claim 19, wherein the rotary feedthrough is securely fixed to the ejector plate.

21. The ejector assembly of claim 14, further comprising a fluid passageway constructed at least partially through the ejector plate and fluidly communicating with the rotary feedthrough.

22. The ejector assembly of claim 19, further comprising passageway means for flow of fluid from the rotary feedthrough via the rotatable shaft to the indexing plate.

23. The ejector assembly of claim 14, wherein the rotary drive is constructed as hydraulic motor, servo motor or direct drive.

24. The ejector assembly of claim 14, wherein the rotary drive is disposed on a side of the ejector plate.

25. The ejector assembly of claim 24, wherein the mold mounting plate is constructed for movement, said side of the ejector plate being distal to the mold mounting plate.

26. The ejector assembly of claim 14, wherein the rotary drive is disposed at a peripheral area or a narrow side of the ejector plate, substantially offset to a length axis of the injection molding machine.

27. The ejector assembly of 17, wherein the force transmitting means includes a toothed wheel rotatably supported by the ejector plate and constructed for meshing engagement with the rotatable shaft.

28. An injection molding machine, comprising:
   a mold mounting plate carrying a mold half;
   a rotatable shaft having one end received in the mold mounting plate;
   an indexing plate constructed for connection to the rotatable shaft and rotatable and axially movable in relation to the mold half;
   an ejector plate operatively connected to another end of the rotatable shaft so that an axial movement between the ejector plate and the mold mounting plate is transmittable to the indexing plate via the rotatable shaft, and
   a rotary drive, disposed on or in the ejector plate, for rotating the indexing plate via the rotatable shaft.

* * * * *